United States Patent [19]

Patel

[11] Patent Number: 4,555,546

[45] Date of Patent: Nov. 26, 1985

[54] COMPATIBILIZED BLENDS OF ACRYLIC ESTER

[75] Inventor: Raman Patel, Akron, Ohio

[73] Assignee: Monsanto Company, St. Louis, Mo.

[21] Appl. No.: 674,240

[22] Filed: Nov. 27, 1984

Related U.S. Application Data

[63] Continuation-in-part of Ser. No. 566,641, Dec. 29, 1983, abandoned.

[51] Int. Cl.⁴ ............ C08L 23/04; C08L 23/26; C08L 33/08; C08L 51/06
[52] U.S. Cl. ............ 525/194; 525/63; 525/69; 525/78; 525/79; 525/80; 525/81; 525/84; 525/85; 525/86; 525/193; 525/195; 525/221; 525/227
[58] Field of Search ........... 525/193, 194, 221, 227, 525/69, 78, 80, 84–86, 90

[56] References Cited

U.S. PATENT DOCUMENTS

| 4,278,572 | 7/1981 | Coran et al. | 260/3 |
| 4,299,931 | 11/1981 | Coran et al. | 525/285 |
| 4,338,411 | 7/1982 | Coran et al. | 525/145 |
| 4,338,413 | 7/1982 | Coran et al. | 525/179 |
| 4,355,139 | 10/1982 | Coran et al. | 525/133 |
| 4,366,289 | 12/1982 | Keskkula et al. | 525/78 |
| 4,395,516 | 7/1983 | Imai et al. | 525/71 |
| 4,409,365 | 10/1983 | Coran et al. | 525/78 |

FOREIGN PATENT DOCUMENTS 295627  1/1967  Australia ............... 525/78

Primary Examiner—Carman J. Seccuro
Attorney, Agent, or Firm—Gordon B. Seward

[57] ABSTRACT

Compatibilized polymer blends are described comprising a blend of olefin polymer, cross-linkable acrylic ester copolymer rubber, and a compatibilizing amount of a graft copolymer comprising acrylic ester copolymer compatibilizing segments and olefin polymer compatibilizing segments.

37 Claims, No Drawings

COMPATIBILIZED BLENDS OF ACRYLIC ESTER

This application is a continuation-in-part of application Ser. No. 566,641, filed Dec. 29, 1983, now abandoned.

This application relates to improved polymer blends of olefin polymer and cross-linkable acrylic ester copolymer rubber, and in particular, blends of enhanced compatibility due to the presence of a graft copolymer comprising acrylic ester copolymer rubber compatibilizing segments and olefin polymer compatibilizing segments.

BACKGROUND OF THE INVENTION

Compatibilized blends of olefin polymer and nitrile rubber are known, U.S. Pat. No. 4,299,931. Although these blends exhibit useful properties, they are not suitable for applications involving low and high temperature exposures. Olefin polymers and acrylic ester copolymer rubber are not very compatible with each other. Their lack of compatibility prevents the development of optimum properties in blends of these materials. Thus, if the compatibility of the blend components can be increased, improved blends may be obtained which can be used where they are subjected to low and high temperature environments.

SUMMARY OF THE INVENTION

It has now been discovered that an improved composition comprising a blend of about 1–99 parts by weight of an olefin polymer which is an amorphous or crystalline essentially saturated homopolymer or copolymer of $C_2$–$C_8$ alpha monoolefins, about 99–1 parts by weight of cured acrylic ester copolymer rubber and at least 0.1 weight percent of a graft copolymer which has at least one olefin polymer compatibilizing segment derived from an olefin polymer which is an amorphous or crystalline essentially saturated homopolymer or copolymer of $C_2$–$C_8$ alpha monoolefins, or from polybutadiene, polyisoprene or a polyalkenamer, and at least one acrylic ester copolymer rubber compatibilizing segment derived from a polymer selected from epichlorohydrin polymers, nitrile rubber, urethane polymers, vinyl chloride polymers, polyamides, polyamines, polyesters and cross-linkable acrylic ester copolymer rubbers, A preferred composition comprises a blend of about 10–90 parts by weight of olefin polymer, and corresponding, about 90–10 parts by weight of acrylic ester copolymer rubber, and 0.5–25 parts by weight of a compatibilizing graft polymer. A more preferred composition comprises a thermoplastic blend of about 20–60 parts by weight of polypropylene, about 80–40 parts by weight of cured acrylic ester copolymer rubber and 0.5–25 parts by weight of a compatibilizing graft polymer in which the rubber is dynamically vulcanized by masticating the blend under vulcanization conditions. It is believed that when the blend is dynamically vulcanized that the cured rubber is in the form of small particles dispersed throughout the polypropylene.

The term "graft copolymer" means a material in which olefin polymer compatibilizing molecular segments and acrylic ester copolymer rubber compatibilizing molecular segments are chemically linked to one another. The term, as used herein, encompasses block copolymers as well. Examples of olefin compatibilizing segments are polybutadiene, polyisoprene, and polyalkenamer segments, as well as segments of the olefin polymers themselves and any other segments compatible with the olefin polymer. Examples of acrylic copolymer rubber compatibilizing segments are segments of epichlorohydrin polymer, nitrile polymer, urethane polymer, vinyl chloride polymer, polyamide, polyamine, acrylic polymer, and polyester, as well as segments of acrylic ester copolymer rubber itself and any other segments compatible with the acrylic ester copolymer rubber. Compatibilizing segments have chemical or physical affinity for olefin polymer or acrylic ester copolymer rubber. The compatibilizing graft copolymer has affinity for both the olefin polymer and the acrylic ester copolymer rubber and its presence improves the compatibility between olefin polymer and acrylic ester copolymer rubber. Examples of satisfactory graft copolymers are described in U.S. Pat. No. 4,299,931, Column 3, which disclosure is incorporated by reference. A thermoplastic graft copolymer of acrylic ester copolymer rubber and olefin polymer is preferred for preparing the improved compatibilized blends of the invention. This graft copolymer may be prepared by causing a reaction to form a bond between the olefin polymer and acrylic ester copolymer rubber. Preferably, only one bond is formed for each olefin polymer molecule and acrylic ester copolymer rubber molecule. Graft copolymers containing more than one bond per molecule are satisfactory; but it is preferred that prior to vulcanization the number of bonds is not so high that the resulting graft copolymer is in the form of a network molecular structure and is no longer thermoplastic. However, during vulcanization of the rubber the graft copolymer may become extensively cross-linked.

One embodiment of the invention relates to an especially effective class of graft copolymers comprising segments of olefin polymer and acrylic ester copolymer rubber, said graft copolymer being prepared from an olefin polymer containing one or more graft forming functional groups. More preferred graft copolymers are prepared from olefin polymer and acrylic ester copolymer rubber each of which contains graft forming functional groups. Examples of satisfactory functional groups are carboxy-, halo- (preferably, chloro- or bromo-), amino-; isocyanate groups, groups derived from methylol phenolic material, hydroxy groups, epoxy groups and sulfonyl, sulfonic acid or salt groups. Functional olefin polymer and acrylic ester copolymer rubber may be prepared by known techniques and some of these materials are commonly available. For example, functional groups may be provided during polymerization by copolymerizing an olefin and a monomer containing functional groups, for example, an unsaturated carboxylic acid. Alternatively, functional groups may be introduced by direct reaction with the polymer by known grafting reactions. The functional groups may react directly to form a graft copolymer between the olefin polymer and acrylic ester copolymer rubber. If the functional groups are such that they will not react with each other, it will be necessary to provide another reactant, herein referred to as a grafting agent, in order to form a graft copolymer. For example, when the functional group of the polyolefin is carboxy and the acrylic ester copolymer rubber also contains carboxy groups a polyfunctional reactant such as a polyamine, preferably a diamine, may react with the carboxy groups to form a graft copolymer. If the functionalities on the polyolefin and the acrylic ester copolymer rubber are hydroxy and amino, a polyisocyanate grafting agent will be effective to form a graft copolymer. Graft copolymers which are derived from methylolphenolic modified olefin polymer or maleic modified olefin polymer, carboxy- containing acrylic ester copolymer rubber, and a diamino grafting agent are especially preferred.

To insure that reaction occurs between functionalizing agent and olefin polymer, it is frequently advisable, and sometimes essential, that the olefin polymer be functionalized in the absence of rubber, before admixture with rubber in a later portion of the procedure.

However, an olefin polymer can be functionalized in the presence of acrylic ester copolymer rubber by the action of a highly active curative such as an azide. Here, molecules of olefin polymer are functionalized by a very small amount of free radical generator which form transient "molecules" of functionalized olefin polymer in which the functional groups are unpaired electrons of the so-formed polymeric free radical. The polymeric free radical (functionalized olefin polymer) then attacks the acrylic ester copolymer rubber molecules to form the compatibilizing graft copolymer molecules which contain molecular segments of both acrylic ester copolymer rubber and olefin polymer. A reduction in either the molecular weight or concentration of acrylic ester copolymer rubber suppresses the formation of rubber gel. Also, low molecular weight rubber molecules are mobile and can diffuse rapidly to the olefin polymer free radical sites for graft copolymer formation; the resulting compatibilizing graft copolymer molecules can also diffuse more rapidly to the olefin polymer- acrylic ester copolymer rubber interface to exert their compatibilizing effect.

Any graft copolymer of olefin polymer and acrylic ester copolymer rubber is suitable for preparing compatibilized blends of the invention. Examples of suitable graft copolymers, methods for preparing them, and the types of linkages visualized between, for example, polypropylene (PP) and acrylic ester copolymer rubber containing carboxy groups (AAR) are shown as follows:

| GRAFT COPOLYMER | SYNTHESIS |
|---|---|
| 1.  | Treat a molten mixture of PP and AAR with a small amount of radical source such as an azide, azo compound, peroxide or radiation source. For example, Silane sulfonyl azide (Hercules ® coupling agent S3076). |
| 2. 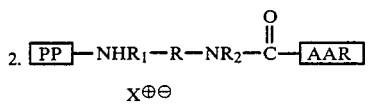 | Halogenated polypropylene and AAR were melt mixed and treated with a grafting agent containing amino functional groups. In general $R^1$ and $R^2$ can be a $C_{1-6}$ alkyl, aryl group (phenyl) or hydrogen. R is a hydrocarbon radical of 2-20 carbon atoms, for example, alkylene, cycloalkylene, arylene or combinations of them. Preferred radicals are radicals of 6-20 carbon atoms. If 4,4-methylene di-aniline (MDA) 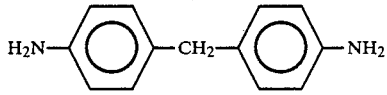 were used, $R_1$, $R_2$ are H and R is 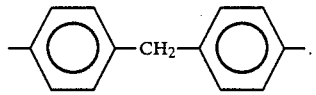. |
| 3. 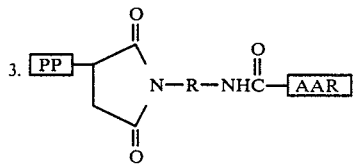 | First treat molten PP with maleic acid or anhydride (in the presence of peroxide) then melt mix with AAR and a grafting agent with —$NH_2$ functional groups. R being the same as in 2. For example, if 4,4'-methylene bis(cyclohexylamine) were used, R is 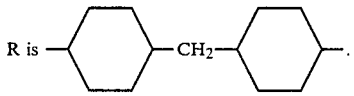. |
| 4. 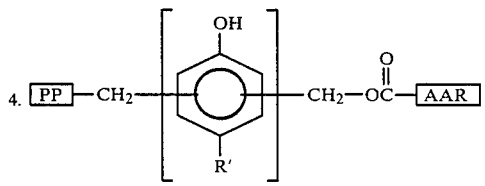 | First molten PP is treated with a dimethylol phenolic derivative (with a catalyst). The modified PP is then melt mixed with AAR. |

| GRAFT COPOLYMER | SYNTHESIS |
|---|---|
| 5. 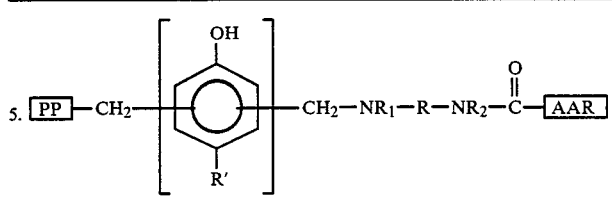 | Dimethylol phenolic modified PP is melt mixed with AAR and a grafting agent containing amino groups. |
| 6. 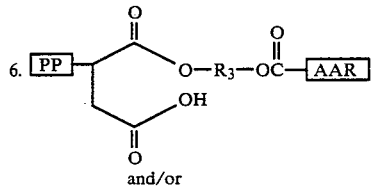 and/or 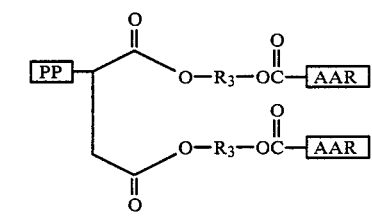 | Maleic acid/anhydride modified PP and AAR are treated with a grafting agent containing —OH functional groups above melt temperature of PP. $R_3$ may be di—, tri—, or tetraalkylene, cycloalkylene or arylene. Preferably, $R_3$ is the same as R above. |
| 7. 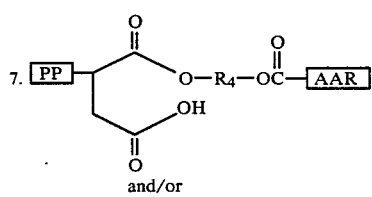 and/or 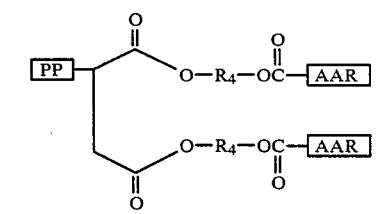 | Maleic acid/anhydride modified PP and AAR are melt mixed and treated with an epoxide wherein $R_4$ is a substituted ethylene radical where the substituent is the residue of the epoxide molecule. |
| 8. 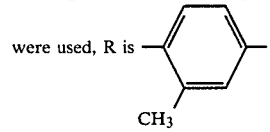 | Maleic acid/anhydride modified PP and AAR are melt mixed and treated with a diisocyanate, wherein R has the same meaning as before. For example, if tolylene 2,4-diisocyanate were used, R is  |

The properties of the rubber-plastic blends and their vulcanizates are improved by the presence of an appropriate compatibilizing graft copolymer. The compatibilizing graft copolymer can be formed by the direct interaction of the functional groups present on the individual components, i.e., the olefin polymer and the acrylic ester copolymer rubber, or by an interaction of these individual components with another bi- or multifunctional compound (grafting agent). The direct interaction of functional groups occurs when the functional group on each component is different, but is capable of reacting with the functional group present on the other component. If, for example, an acid or anhydride group is present on one component, then any other component with an —OH, $$\underset{O}{\diagdown\!\diagup}$$

—NHR, —CH₂OH, or —NCO group can interact to form a compatibilizing graft copolymer. If both the components have similar groups, such as an acid group, then a di- or poly-functional grafting agent such as a diol or polyol, for example, pentaerythritol, a diamine, for example, methylene dianiline, an epoxide, di- or polyisocyanate, etc., can be used to react with both the functionalized olefin polymer and acrylic ester copolymer rubber. When dissimilar groups which do not react with one another, such as an —OH on one component and a halogen or —NHR are present on the other component, then the bridging compound should be such that its functional groups should interact with both the components. To prepare the compatibilizing graft copolymer in another way, one can mix the appropriate components together and treat the mixture with a radical source such as a peroxide, radiation, or a bis azo compound. The compatibilizing graft copolymer may be pre-formed and then added to the blend or it may be formed in situ.

Generally, the amount of graft forming functional groups does not exceed 10 weight percent of the olefin polymer or acrylic ester copolymer rubber. It can, however, be considerably lower with amounts of about 1 percent or less being enough to cause sufficient graft copolymer formation to enhance the compatibility of a blend of olefin polymer and acrylic ester copolymer rubber.

The compatibilizing graft copolymer can be formed from compatibilizing segments provided they are functionalized so as to mutually interact to form a link therebetween.

A suitable functionalized olefin polymer may be conveniently prepared by masticating olefin polymer, preferably at a temperature above its melting point, for a period of about 1–20 minutes, and 0.1 to 20 weight percent methylol phenolic material, in the presence of an activator (catalyst) which promotes reaction between methylol phenolic material and the olefin polymer. An example of a satisfactory activator is a Lewis acid. Another suitably functionalized olefin polymer may be prepared by causing an unsaturated carboxylic acid such as acrylic or methacrylic acid, maleic acid, anhydride, or ester, or N-substituted maleamic acid, to react in the presence of a free radical generator with olefin polymer, by known processes. For example, see U.S. Pat. No. 2,973,344. The resulting functionalized olefin polymer is then caused to react with functionalized acrylic ester copolymer rubber.

Olefin polymers suitable for functionalization to give graft copolymer precursors comprise amorphous or crystalline essentially saturated homopolymers or copolymers of $C_2$–$C_8$ alpha monoolefins. Thermoplastic crystalline olefin polymers are especially preferred. An important subgroup of olefin polymers comprises high molecular weight solid products from the polymerization of one or more monoolefins by either high pressure or low pressure processes. Examples of such polymers are the isotactic or syndiotactic monoolefin polymers, representative members of which are commercially available. Satisfactory olefins include ethylene, propylene, 1-butene, 1-pentene, 1-hexene, 2-methyl-1-propene, 3-methyl-1-pentene, 4-methyl-1-pentene, 5-methyl-1-hexene, and mixtures thereof. Commercially available thermoplastic polyolefin resins, such as polyethylene, polybutene-1, and polypropylene, or mixtures thereof, may be advantageously used in the practice of the invention with polypropylene being preferred. Also suitable for the practice of the invention are copolymers of two or more olefins with copolymers of ethylene and propylene being preferred.

Any methylol phenolic material which will form a graft with olefin polymer may be used in the practice of the invention. Suitable methylol phenolic material may be prepared by condensation of unsubstituted phenol, a $C_1$–$C_{10}$ alkyl-p-substituted phenol, or halogen substituted phenol with an aldehyde, preferably, formaldehyde in an alkaline medium, or by condensation of phenol dialcohols. Methylol phenolic material includes polymeric phenols containing up to 10 benzene rings but preferred materials contain no more than three benzene rings. Especially preferred are methylol phenolic materials derived from dimethylol phenol substituted with $C_5$–$C_{10}$ alkyl groups preferably tertiary alkyl groups in the para position. Examples of satisfactory dimethylol phenolic materials are described in U.S. Pat. Nos. 2,972,600; 3,093,613; 3,287,440; 3,709,840; and 3,211,804, Column 5, lines 3–67, the disclosures of which are incorporated herein by reference. Halogenated, for example brominated, methylol phenolic materials are also suitable. These halogenated materials release, at elevated temperatures, hydrogen halide, which in the presence of a metal oxide such as zinc oxide, serves as an acidic activator. Suitable methylol phenolic materials are commercially available; for example, they may be purchased under the trade names of SP-1045, SP-1055, SP-1056, CRJ 352, and certain Arofene resins.

Any activator (catalyst) which promotes the graft formation between olefin polymer and methylol phenolic materials is suitable for the practice of the invention. Preferred activators are Lewis acids which include the acid-acting metal halides such as boron trifluoride, stannous chloride, zinc chloride, titanium tri- or tetrachloride, aluminum chloride, ferric chloride, ferric bromide, zinc bromide, aluminum bromide or complexes thereof. Suitable Lewis acids are described in U.S. Pat. No. 4,121,026, Columns 5–6, the disclosure of which is incorporated herein by reference.

Suitable acrylic ester copolymer rubbers comprise rubbery, cross-linkable acrylic ester copolymers. The rubbers of the invention are copolymers of one or more $C_1$–$C_4$ alkyl acrylate or methacrylate ester with one or more $C_2$–$C_8$ alpha olefins or dissimilar $C_1$–$C_4$ alkyl acrylate or methacrylate ester, and are cross-linkable by virtue of having reactive groups such as carboxy, hydroxy, epoxy, halo, amino, isocyanates, sulfonyl or sulfonate groups. These rubbers may be prepared by copolymerizing an alkyl ester of an unsaturated carboxy acid with another such ester or with an alpha olefin and a third monomer containing any of the reactive groups referred to above. Or, a cross-linkable acrylic ester rubber can be prepared by the process of U.S. Pat. No. 4,415,710, the disclosure of which is hereby incorporated by reference. Preferred rubbers include acrylic acid-acrylic ester-alpha-olefin terpolymers which are essentially non-crystalline and have glass transition temperatures (Tg) below room temperature. The rubber may be prepared by partial hydrolysis of a polyacrylate rubber to obtain the required acid groups. Polyacrylate rubbers suitable for this preparation are described in Rubber World Blue Book, 1975 Edition, pages 399–400. Suitable acidic copolymer rubbers are preferably prepared by polymerization of alkyl acrylate, acrylic acid or methacrylic acid and an alpha olefin of 2–8 carbon atoms. A preferred rubber is a polymer of ethylene, $C_1$–$C_4$ alkyl acrylate and acrylic acid. A more preferred acrylic acid rubber is a polymer comprising at least 50 mole percent of ethylene, about 0.5 to 10 mole percent acrylic acid and about 10 to 49.5 mole percent of alkyl acrylate.

The improved blends of the invention may be prepared by mixing olefin polymer, acrylic ester copolymer rubber, and graft copolymer, preferably above the melting point of the olefin polymer by use of conventional masticating equipment, for example, a rubber mill, Brabender Mixer, Banbury Mixer, or twin screw continuous mixer. Mixing times should be sufficient to obtain homogeneous blends. Satisfactory mixing times depend upon the types of olefin polymer and acrylic ester copolymer rubber and upon the type and amount of graft copolymer. Typically, mixing times of about 0.5-30 minutes are satisfactory. If the polymer blend is obviously non-homogeneous, additional mixing is required. When the blend components are thoroughly mixed, improved properties are obtained.

The compatibilized blends of the invention are further improved by cross-linking, or curing acrylic ester copolymer rubber by conventional techniques. Cross-linking agents (curatives) are incorporated into the blends and the blends are heated to effect cure. The characteristics of the blends containing cured acrylic ester copolymer rubber depend upon the relative proportions of olefin polymer and acrylic ester copolymer rubber and whether the compositions are statically or dynamically cured. Static curing can give thermoset compositions when the blend contains more than 30 parts by weight of cured acrylic ester copolymer rubber per 100 parts by weight of total polymer; whereas, dynamic curing can give thermoplastic compositions even when the blend contains 80 or more parts by weight of cured acrylic ester copolymer rubber per 100 parts by weight of total polymer. Generally, compositions comprising about 50 parts or more of cured acrylic ester copolymer rubber per 100 parts by weight of olefin polymer are elastomeric. The effect of the relative proportions on blend composition characteristics cannot be defined with precision because the limits vary depending upon a number factors, such as, the kind of olefin polymer and acrylic ester copolymer rubber, the presence of fillers, plasticizers and other ingredients, and the extent the rubber is cured. When preparing graft copolymer in situ, it is not necessary that the grafting agent and the rubber curative are the same material, however, often it is convenient and sometimes preferred that they are the same. Generally, the graft copolymer forms prior to or simultaneous with curing (cross-linking) the rubber. Of course, it is understood that the properties of the compositions of the invention may be modified by the addition of ingredients which are conventional in the compounding of olefin polymer, acrylic ester copolymer rubber, and blends thereof. For additional information concerning compounding and dynamic vulcanization, refer to U.S. Pat. No. 4,104,210, issued Aug. 1, 1978. Compositions prepared by dynamic vulcanization comprising a blend of about 20-60 parts by weight of olefin polymer, preferably polypropylene, and correspondingly, about 80-40 parts by weight of cured acrylic ester copolymer rubber in the form of small particles (preferably 50 microns or less) dispersed throughout the olefin polyner, in which the blend has been compatibilized, before or after vulcanization, with a graft copolymer comprising olefin polymer compatibilizing segments and acrylic ester copolymer rubber compatibilizing segments are especially preferred. Elastomer compositions generally contain no more than 55 parts of polypropylene per 100 parts of the composition.

Improved blend compositions of the invention can be used to form a variety of molded, extruded, or calendered articles. The properties of the blend depend upon the proportions of the components in the blend with a wide range of properties being available simply by varying the proportions of the blend components.

The stress-strain properties of the composition are determined in accordance with ASTM test procedure D-638. True stress at break (TSB) is the tensile strength at break multiplied by the extension ratio also at break, extension ratio being the length of a tensile test specimen at break divided by the original, unstressed length of the test specimen. Alternatively, extension ratio is 1.00 plus 1/100 of the percent ultimate elongation.

DESCRIPTION OF THE PREFERRED EMBODIMENTS

Modified (Functionalized) Olefin Polymers

Polypropylene having maleic acid groups grafted thereto is prepared by feeding a blend of 100 parts of polypropylene (Profax ® 6723), 2.5 parts of maleic acid and 2 parts of an organic peroxide, 2,5-dimethyl-2,5-bis(t-butylperoxy)hexane (40% active on clay), Luperco ® 101X to a Reedco twin-screw mixing extruder at 200° C. with a feed rate of 200 g/min. All parts are by weight in this and the following examples. The product, maleic acid modified polypropylene, is designated MA-PP-1.

Polyethylene, having maleic acid groups grafted thereto, is prepared by masticating 100 parts of high density polyethylene (Marlex ® EHM 6006), 2.5 parts of maleic acid and 0.05 parts of 2,5-dimethyl-2,5-bis(t-butylperoxy)hexane (90% active), Lupersol ® 101 at 80 rpm in a Brabender mixer. The batch size is 50-55 grams and cam type rotors are used. The polyethylene and maleic acid are first melt mixed at 150° C. and then the peroxide is added and mixing is continued for about 5 minutes at 160°-165° C. The mass is then removed and cooled in a press. The product, maleic acid modified polyethylene is designated MA-PE-1.

The same procedure is followed except low density polyethylene (Dowlex ® 2476) and 0.1 part of peroxide are used. The product, maleic acid modified polyethylene is designated MA-PE-2.

Polypropylene having methylol phenolic groups grafted thereto is prepared by masticating 100 parts polypropylene (Profax 6723) and 2 parts of dimethylol-p-octylphenol (SP-1045) at 80 rpm and 190° C. in a Brabender until a molten homogeneous mixture is obtained. 0.2 parts of $SnCl_2.2H_2O$ are added and mixing is continued for 3 minutes. The mass is then removed and cooled in a press. The product is designated Ph.Mod.-PP.

Polypropylene having amino groups grafted thereto is prepared by first preparing a maleic acid modified polypropylene and then reacting it with excess diamine. To a Brabender mixer at 180° C. and 100 rpm, there are charged 100 parts of polypropylene (Profax 6801) and 2.5 parts of maleic acid. After the mass is molten and mixed, there is added 0.15 parts of organic peroxide, Lupersol 101, and mixing is continued for five minutes. Five parts of 4,4'-methylene bis(cyclohexylamine) is then added and mixing is continued for five minutes at 190° C. The mass is removed, cooled, crushed and then dissolved in boiling xylene. The product precipitates from the solution upon cooling. The unreacted 4,4'-methylene bis(cyclohexylamine) and any by-products are removed by washing with acetone. The product, amine-modified polypropylene, is designated DA-mod.-PP.

A graft copolymer is prepared by melt mixing at 190° C. for 4–5 minutes in a Brabender mixer, 40 parts of DA- mod.-PP and 60 parts of acidic acrylic ester copolymer rubber, Vamac G (described in greater detail below). The product designated Graft Copolymer-1 is a graft copolymer comprising polypropylene compatibilizing segments and acidic acrylic ester copolymer rubber compatibilizing segments.

Compatibilized-Polymer-Compositions

Compatibilized polymer compositions are prepared by melt mixing olefin polymer, acrylic ester copolymer rubber and a graft copolymer (compatibilizing agent). Usually, the graft copolymer is made in situ by melt mixing a functionalized olefin polymer and acrylic ester copolymer rubber with a difunctional grafting agent. Since usually the grafting agent is also a curative for the rubber, it is convenient to use enough grafting agent (rubber curative) to form the graft copolymer and to cross-link the rubber. Preferably, the rubber is dynamically vulcanized, i.e., the mass of molten olefin polymer and rubber are masticated until the rubber is cured.

Materials used to illustrate the invention are as follows: acidic acrylic ester copolymer rubber (AAR) in the tables) is purchased under the tradename Vamac, believed to be a terpolymer of about 73 mole percent of ethylene, about 26 mole percent of methyl acrylate and about one mole percent of a carboxylic acid. Vamac G is the neat terpolymer. Vamac 123 is a masterbatch of 100 parts of rubber and 23 parts of fumed silica, stabilizers and processing aids which, for convenience, are shown separately in the tables and designated S,S, PA. An amine antioxidant, Naugard 445, is designated in the tables as N-445. Polypropylene (PP) is Profax® 6723. Low density polyethylene (LDPE) is Dowlex® 2476, high density polyethylene (HDPE) is Marlex® EHM-6006. 4,4'-methylene dianiline, is designated MDA. 4,4'-methylene bis(cyclohexylamine) is designated MCA. Hexamethylenediamine carbamate is DIAK-1. DIAK-4. MDA, MCA, DIAK-1 and DIAK-4 act both as grafting agents and rubber curatives. All parts are by weight in the tables.

Compositions of the invention comprising improved compatibilized blends are illustrated in Tables 1–8. Table 1 illustrates compositions prepared from pre-prepared graft copolymer compatibilizing agent and from graft copolymer compatibilizing agent prepared in situ. The acidic acrylic ester copolymer rubber (AAR) is Vamac G. The DA modified-PP1 and Graft Copolymer-1 are as described above. Compositions of Stocks 1, 3, and 5 are prepared by melt mixing at 100 rpm at 190° C. for five minutes in a Brabender mixer. The stocks are removed, then returned to the mixer and remixed for one additional minute. Compositions 2, 4 and 6–9 were dynamically vulcanized by masticating in the presence of curatives. After melt mixing the AAR and PP for two minutes, the stabilizer and curatives are added. The MDA is added before the MCA or DIAK-4 is added. Mixing (at 190° C. and 100 rpm) is continued for 3 minutes after maximum consistency is reached. In Stocks 3, 4 and 8, the Graft Copolymer-1 is added before the curatives. In Stock 9, the Graft Copolymer-1 is added after vulcanization is complete as indicated by maximum consistency of the Brabender mixer. The stocks are removed, then returned to the mixer and re-mixed for one additional minute. All compositions are compression molded at 210° C. Tensile properties of specimens are evaluated on a T-500 Tensometer at a speed of 20 inches (50.8 cm) per minute. Stocks 1, 2 and 3 are controls of unvulcanized and vulcanized compositions, respectively, of a blend of acidic acrylic ester copolymer rubber and unmodified polypropylene. The data shows that tensile properties are improved by vulcanization. Stock 3 shows that the addition of a graft copolymer has little effect in the absence of curatives while Stock 4 shows that tensile properties are about double when the rubber is cured in the presence of the graft copolymer. It should be noted that the compositions are nearly the same as the controls since the graft copolymer contains 60% AAR and 40% polypropylene. Stock 6 illustrates the

TABLE 1

|  | 1 | 2 | 3 | 4 | 5 | 6 | 7 | 8 | 9 |
|---|---|---|---|---|---|---|---|---|---|
| AAR | 60 | 60 | 54 | 54 | 60 | 60 | 60 | 60 | 60 |
| PP | 40 | 40 | 36 | 36 | 36 | 36 | 40 | 40 | 40 |
| DA-Mod. PP-1 | — | — | — | — | 4 | 4 | — | — | — |
| Graft Copolymer-1 | — | — | 10 | 10 | — | — | — | 6 | 6 |
| MDA | — | 0.9 | — | 0.9 | — | 0.9 | 1.2 | 1.2 | 1.2 |
| MCA | — | 0.6 | — | 0.6 | — | 0.6 | — | — | — |
| DIAK-4 | — | — | — | — | — | — | 0.3 | 0.3 | 0.3 |
| N-445 | 1.2 | 1.2 | 1.2 | 1.2 | 1.2 | 1.2 | 1.2 | 1.2 | 1.2 |
| Properties |  |  |  |  |  |  |  |  |  |
| TS, MPa | 3.8 | 9.2 | 2.8 | 18.6 | 4.3 | 20.6 | 11.4 | 18.6 | 18.9 |
| $M_{300}$, MPa | — | — | — | 14.8 | — | 15.7 | 10.1 | 12.6 | 12.3 |
| UE, % | 80 | 160 | 120 | 390 | 150 | 450 | 440 | 470 | 470 |
| Ten. Set, % | Broke | 46 | 81 | 43 | 81 | 39 | 56 | 41 | 45 |

4,4'-methylene bis(cyclohexylamine)carbamate is

TABLE 2

|  | 1 | | 2 | | 3 | | 4 | | 5 | |
|---|---|---|---|---|---|---|---|---|---|---|
|  | (a) | (b) | (a) | (b) | (a) | (b) | (a) | (b) | (a) | (b) |
| AAR | 10 | 10 | 20 | 20 | 30 | 30 | 40 | 40 | 50 | 50 |
| PP | 90 | 85.5 | 80 | 72 | 70 | 63 | 60 | 54 | 50 | 45 |
| MA-PP-1 | — | 4.5 | — | 8 | — | 7 | — | 6 | — | 5 |
| MDA | 0.15 | 0.15 | 0.3 | 0.3 | 0.45 | 0.45 | 0.6 | 0.6 | 0.75 | 0.75 |
| MCB | 0.1 | 0.1 | 0.2 | 0.2 | 0.3 | 0.3 | 0.4 | 0.4 | 0.5 | 0.5 |
| N-445 | 0.2 | 0.2 | 0.4 | 0.4 | 0.6 | 0.6 | 0.8 | 0.8 | 1.0 | 1.0 |
| Properties |  |  |  |  |  |  |  |  |  |  |

TABLE 2-continued

|  |  |  |  |  |  |  |  |  |  |
|---|---|---|---|---|---|---|---|---|---|
| TS, MPa | 21.4 | 34.6 | 17.4 | 37.2 | 14.4 | 38.6 | 13.2 | 26.9 | 11.1 | 25.8 |
| $M_{100}$, MPa | 19.8 | 21.3 | — | 22.5 | — | 23.5 | — | 16.0 | — | 16.3 |
| U.E., % | 380 | 490 | 220 | 520 | 135 | 540 | 150 | 550 | 185 | 525 |
| Tension Set, % | Broke | Necked | Broke | Necked | Broke | 59 | 67 | 54 | 56 | 48 |
| TSB, MPa | 103 | 204 | 56 | 231 | 34 | 247 | 33 | 175 | 32 | 162 |

|  | 6 | | 7 | | 8 | | 9 | |
|---|---|---|---|---|---|---|---|---|
|  | (a) | (b) | (a) | (b) | (a) | (b) | (a) | (b) |
| AAR | 60 | 60 | 70 | 70 | 80 | 80 | 90 | 90 |
| PP | 40 | 36 | 30 | 27 | 20 | 18 | 10 | 9 |
| MA-PP | — | 4 | — | 3 | — | 2 | — | 1 |
| MDA | 0.9 | 0.9 | 1.05 | 1.05 | 0.36 | 0.36 | 0.41 | 0.41 |
| MCBA | 0.6 | 0.6 | 0.7 | 0.7 | 0.24 | 0.24 | 0.27 | 0.27 |
| Stabilizer | 1.2 | 1.2 | 1.4 | 1.4 | 1.6 | 1.6 | 1.8 | 1.8 |
| Properties |  |  |  |  |  |  |  |  |
| TS, MPa | 9.2 | 25.1 | 9.2 | 17.1 | 4.9 | 8.4 | 3.3 | 4.5 |
| $M_{300}$, MPa | — | 13.7 | — | 12.3 | 3.8 | 5.2 | 1.4 | 1.5 |
| U.E., % | 190 | 515 | 275 | 420 | 630 | 640 | 780 | 1150 |
| Tension Set, % | 43 | 37 | 29 | 25 | 41 | 47 | 13 | 17 |
| TSB, MPa | 27 | 155 | 35 | 89 | 36 | 62 | 29 | 56 |

TABLE 3

|  | 1 | 2 | 3 | 4 | 5 | 6 |
|---|---|---|---|---|---|---|
| AAR | 60 | 60 | 60 | 60 | 60 | 60 |
| S,S, PA | 13.8 | 13.8 | 13.8 | 13.8 | 13.8 | 13.8 |
| PP | 36 | 36 | 36 | 36 | 36 | 36 |
| MA-PP-1 | 4 | 4 | 4 | 4 | 4 | 4 |
| MDA | 1.2 | — | 0.3 | 0.3 | 0.6 | 1.2 |
| DIAK-1 | — | 1.2 | 0.9 | — | — | — |
| DIAK-4 | — | — | — | 0.9 | 0.6 | 0.3 |
| Properties |  |  |  |  |  |  |
| TS, MPa | 24.4 | 21.7 | 17.1 | 19.0 | 20.2 | 20.8 |
| $M_{300}$, MPa | 16.1 | 19.2 | 16.5 | — | 17.7 | 17.9 |
| UE, % | 430 | 350 | 330 | 270 | 380 | 370 |
| Ten. Set, % | 37 | 30 | 33 | 30 | 33 | 33 |
| TSB, MPa | 129 | 98 | 74 | 70 | 97 | 98 |
| #3 ASTM Oil, (70 h, 100° C.) wt. % swell | 27 | 29 | 23 | 24 | 24 | 23 |
| Hot Air Aging-7 days @ 125° C. |  |  |  |  |  |  |
| TS, MPa | 21.3 | 19.5 | 21.4 | 18.1 | 19.0 | 22.0 |
| UE, % | 350 | 260 | 180 | 170 | 230 | 210 |
| TSB, MPa | 129 | 98 | 74 | 70 | 97 | 98 |

TABLE 4

|  | 1 | 2 | 3 | 4 | 5 | 6 | 7 | 9 | 10 | 11 |
|---|---|---|---|---|---|---|---|---|---|---|
| AAR | 50 | 0 | 50 | 50 | 50 | 50 | 50 | 75 | 75 | 25 | 25 |
| S,S + PA | 11.5 | 11.5 | 11.5 | 11.5 | 11.5 | 11.5 | 11.5 | 17.25 | 17.25 | 5.75 | 5.75 |
| PP | 50 | 49.5 | 47.5 | 45 | 40 | 30 | — | 25 | 22.5 | 75 | 67.5 |
| MA-PP-1 | — | 0.5 | 2.5 | 5 | 10 | 20 | 50 | — | 2.5 | — | 7.5 |
| MDA | 1.5 | 1.5 | 1.5 | 1.5 | 1.5 | 1.5 | 1.5 | 2.25 | 2.25 | 0.75 | 0.75 |
| DIAK-4 | 0.25 | 0.25 | 0.25 | 0.25 | 0.25 | 0.25 | 0.25 | 0.38 | 0.38 | 0.13 | 0.13 |
| Properties |  |  |  |  |  |  |  |  |  |  |  |
| TS, MPa | 11.6 | 15.5 | 25.0 | 28.7 | 24.5 | 23.7 | 16.7 | 8.1 | 18.4 | 18.3 | 27.1 |
| $M_{300}$, MPa | — | — | 18.1 | 18.3 | 17.9 | 17.9 | 14.4 | 7.6 | 7.9 | — | 18.3 |
| U.E., % | 97 | 290 | 410 | 445 | 405 | 415 | 230 | 120 | 295 | 63 | 460 |
| Tension Set, % | broke | 45 | 42 | 40 | 39 | 41 | 46 | 18 | 17 | broke | 62 |
| TSB, MPa | 23 | 60 | 128 | 156 | 124 | 122 | 55 | 18 | 73 | 30 | 152 |

TABLE 5

|  | 1 | 2 | 3 | 4 | 5 | 6 | 7 | 8 | 9 | 10 |
|---|---|---|---|---|---|---|---|---|---|---|
| AAR | 60 | 60 | 60 | 60 | 60 | 60 | 60 | 60 | 60 | 60 |
| S,S + PA | 13.8 | 13.8 | 13.8 | 13.8 | 13.8 | 13.8 | 13.8 | 13.8 | 13.8 | 13.8 |
| HDPE | 40 | 36 | 32 | 28 | 20 | — | — | — | — | — |
| LDPE | — | — | — | — | — | 40 | 36 | 32 | 28 | 20 |
| MA-PE-1 | — | 4 | 8 | 12 | 20 | — | — | — | — | — |
| MA-PE-2 | — | — | — | — | — | — | 4 | 8 | 12 | 20 |
| Properties |  |  |  |  |  |  |  |  |  |  |
| TS, MPa | 12.3 | 16.8 | 18.5 | 19.6 | 17.4 | 12.6 | 15.4 | 15.9 | 15.9 | 16.8 |
| $M_{300}$ MPa | — | 14.5 | 14.8 | 13.1 | 14.8 | — | 14.1 | 12.8 | 12.6 | 13.3 |
| U.E., % | 210 | 360 | 380 | 440 | 360 | 280 | 340 | 360 | 380 | 370 |
| Ten. Set, % | 38 | 34 | 35 | 39 | 37 | 25 | 24 | 27 | 27 | 29 |
| TSB, MPa | 38 | 77 | 89 | 106 | 80 | 48 | 68 | 73 | 76 | 79 |

TABLE 6

|  | 1 | 2 | 3 | 4 | 5 |
|---|---|---|---|---|---|
| AAR | 60 | 60 | 60 | 60 | 60 |
| S,S, PA | 13.8 | 13.8 | 13.8 | 13.8 | 13.8 |
| PP | 40 | — | 40 | — | 20 |
| Ph.-Mod.-PP | — | 40.9 | — | 40.9 | 20.4 |
| MDA | — | — | 1.8 | 1.8 | 1.8 |
| Properties |  |  |  |  |  |
| TS, MPa | 4.8 | 5.9 | 10.7 | 22.1 | 17.2 |
| $M_{100}$, MPa | 4.9 | 5.9 | 10.0 | 10.1 | 10.0 |
| UE, % | 190 | 175 | 140 | 405 | 355 |
| Ten. Set, % | 80 | broke | 34 | 34 | 34 |
| TSB, MPa | 14 | 16 | 26 | 112 | 78 |

TABLE 7

|  | 1 | 2 | 3 | 4 | 5 | 6 | 7 | 8 | 9 | 10 | 11 | 12 |
|---|---|---|---|---|---|---|---|---|---|---|---|---|
| AAR | 60 | 60 | 60 | 60 | 60 | 60 | 60 | 60 | 60 | 60 | 60 | 60 |
| S,S, PA | 13.8 | 13.8 | 13.8 | 13.8 | 13.8 | 13.8 | 13.8 | 13.8 | 13.8 | 13.8 | 13.8 | 13.8 |
| PP | 40 | 36 | 40 | 36 | 40 | 36 | 40 | 36 | 40 | 36 | 40 | 36 |
| Cl-PP | — | 4 | — | — | — | — | — | — | — | — | — | — |
| MA-PP-1 | — | — | — | 4 | — | 4 | — | 4 | — | 4 | — | 4 |
| MDA | 1.8 | 1.8 | — | — | — | — | — | — | — | — | — | — |
| Silane A-1100 | — | — | 1.8 | 1.8 | — | — | — | — | — | — | — | — |
| Silane A-187 | — | — | — | — | 1.8 | 1.8 | — | — | — | — | — | — |
| Pentaerthyritol | — | — | — | — | — | — | 1.8 | 1.8 | — | — | — | — |
| Epoxide, Epon 828 | — | — | — | — | — | — | — | — | 2.4 | 2.4 | — | — |
| Tolylene 2,4-diisocyanate | — | — | — | — | — | — | — | — | — | — | 2.4 | 2.4 |
| Properties |  |  |  |  |  |  |  |  |  |  |  |  |
| TS, MPa | 10.7 | 22.6 | 9.5 | 14.5 | 9.2 | 11.0 | 9.6 | 21.4 | 9.9 | 13.2 | 11.4 | 23.5 |
| M$_{300}$, MPa | — | 12.3 | — | 14.5 | — | — | — | 18.2 | — | 13.2 | — | 16.3 |
| UE, % | 140 | 510 | 110 | 300 | 60 | 270 | 80 | 350 | 160 | 300 | 190 | 420 |
| Ten. Set, % | 34 | 38 | broke | 47 | broke | 50 | broke | 32 | 52 | 41 | 40 | 40 |
| TSB, MPa | 26 | 138 | 20 | 58 | 15 | 41 | 17 | 96 | 26 | 53 | 33 | 122 |

TABLE 8

|  | 1 | 2 | 3 | 4 | 5 | 6 | 7 | 8 | 9 |
|---|---|---|---|---|---|---|---|---|---|
| Plasticizer | none | M-17 | 79TM | B-16 | 429 | diundecyl phthalate | 148 | 711 | 97 |
| Properties |  |  |  |  |  |  |  |  |  |
| TS, MPA | 27.3 | 20.6 | 18.9 | 19.8 | 20.8 | 19.5 | 20.0 | 21.6 | 19.2 |
| M$_{300}$, MPa | 20.5 | 16.1 | 17.2 | 16.2 | 17.8 | 17.2 | 16.2 | 18.7 | 17.2 |
| UE, % | 430 | 430 | 340 | 410 | 370 | 360 | 390 | 370 | 350 |
| Shore D Hardness | 44 | 38 | 37 | 38 | 38 | 36 | 39 | 38 | 17 |
| Ten. Set, % | 35 | 32 | 27 | 30 | 31 | 26 | 34 | 27 | 24 |
| #3 ASTM Oil, 70 h @ 100° C. wt. % Swell | 38 | 29 | 28 | 30 | 34 | 27 | 30 | 28 | 28 | preparation of a graft copolymer in situ by the reaction of modified PP, AAR and grafting agent (curative). The curative, MDA, serves both as a grafting agent to form a graft copolymer comprising polypropylene compatibilizing segments and rubber compatibilizing segments and as a rubber curative. The data shows that blends containing graft copolymer prepared in situ exhibit superior properties. The data of Stocks 8 and 9 show that improved compatibilized blends are obtained when the graft copolymer is added either before or after dynamic vulcanization.

The effect of the relative proportions of polypropylene and acidic acrylic ester copolymer rubber is illustrated in Table 2. The acidic ester copolymer rubber, polypropylene, stabilizer and curatives are the same as in Table 1. A maleic acid functionalized polypropylene is used as an intermediate for the in situ formation of a graft copolymer compatibilizer. The proportions of rubber and polypropylene are varied from 10-90 and 90-10 parts by weight, respectively, in steps of 10 parts by weight. For each composition, there is a control (a) comprising unmodified polypropylene. In compositions of the invention (b), 10 percent of the polypropylene is replaced by maleic acid modified polypropylene. The compositions are melt mixed and dynamically vulcanized by the procedure of Table 1. Specimens are compression molded at 220° C. Tensile properties are determined as in Table 1, except for Stocks 1-3 which were pulled at 2 inches (5.08 cm) per minute. The data show that each composition containing maleic acid modified polypropylene (in situ graft copolymer formed) exhibit substantially improved tensile strength and ultimate elongation. The data show that the true stress at break is two or more times greater when the graft copolymer is present.

A study of curatives is shown in Table 3. The acidic acrylic ester copolymer rubber is Vamac 123 which is a masterbatch containing 13.8 part silica, stabilizers and processing aids (S,S,PA). The compositions are prepared and tested by the procedures of Table 1. The data show that excellent compositions are obtained with each of the curative systems. The data indicate that MDA is superior, especially upon aging.

The effect of the amount of functionalized polypropylene on blend properties is shown in Table 4. The rubber is Vamac 123. The curative level is held constant with 3 parts of MDA and 0.5 DIAK-4 for 100 parts of rubber. The compositions are prepared and tested by the procedures of Table 1. The amount of maleic acid modified polypropylene is varied from replacing one percent of the unmodified polypropylene to replacing it completely. The data of Stock 2 indicates that improved compositions are obtained by replacing one percent of the unmodified polypropylene with MA-modified polypropylene. The data of Stock 4 indicates that replacing ten percent of the polypropylene with MA-modified polypropylene results in compositions exhibiting optimum properties. This suggests that the optimum amount of graft copolymer has been formed. Stock 7 shows that all of the polypropylene can be replaced by modified polypropylene, but that lower tensile properties result. Stocks 9 and 11 illustrate compositions with different rubber/polypropylene ratios.

Compositions of the invention comprising polyethylene and the effect of the amount of functionalized polyethylene are illustrated in Table 5. The compositions are prepared and tested by the procedures of Table 1. The amounts of curatives and stabilizer for all compositions are 1.2 parts of MDA, 0.3 parts of DIAK-4 and 1.2 parts of N-445. The data indicate that larger quantities of functionalized polyethylene are required for optimum properties (as compared to PP compositions) and that high density polyethylene compositions exhibit better tensile properties than corresponding compositions containing low density polyethylene.

Compositions of the invention in which the graft copolymer compatibilizing agents are made in situ from methylol phenolic modified polypropylene are illustrated in Table 6. The compositions are prepared and tested by the procedures of Table 1. Stock 1 is a control with unmodified polypropylene and no curative. Stock 2 is a composition corresponding to Stock 1 except the polypropylene is replaced with phenolic modified polypropylene. Stock 3 is a composition corresponding to Stock 1, but is dynamically vulcanized. Stock 4 is a composition corresponding to Stock 2, but a graft copolymer is formed in situ and the composition is dynamically vulcanized. The true stress at break of Stock 4 indicates that this composition is 4 or more times better than the controls. Stock 5 illustrates a composition comprising a 50/50 mixture of unmodified polypropylene and phenolic modified polypropylene.

Compositions of the invention comprising graft copolymers made in situ from various grafting agents (curatives) are illustrated in Table 7. The compositions are prepared and tested by the procedures of Table 1. The odd numbered stocks are controls and the even numbered stocks are illustrative of compatibilized blends of the invention. Stock 2 contains chlorinated polypropylene, 26% Cl, m.p. 100° C., Polycoat CP26P. Stocks 3 and 4 contain as grafting agent/curative gamma-aminopropyltriethyloxysilane, Silane® A-1100. Stocks 5 and 6 contain as grafting agent/curative gamma-glycidoxypropyltrimethoxysilane, Silane® A-187: Stocks 9 and 10 contain as grafting agent/curative a bisphenol-A/epichlorohydrin-based epoxy curing resin, Epson 828. The data show that superior compositions are obtained by the presence of a graft copolymer prepared in situ from a functionalized polypropylene. The data also show that compositions comprising chlorinated polypropylene (Stock 2), pentaerthyritol (Stock 8) and tolylene 2,4-diisocyanate (Stock 12) exhibit extraordinarily good tensile properties.

Compositions of the invention containing plasticizers are illustrated in Table 8. A base composition containing the same components as Stock 6(b) of Table 2 plus 24 parts of silica (HiSil 210), 0.24 parts of silane coupling agent (A-1100) and 0.36 parts of lubricant (Zelec® UN) is prepared by dynamic vulcanization in a "B" Banbury mixer. The additional components are masterbatched with the rubber (Vamac G) before adding the other ingredients prior to dynamic vulcanization. Plasticized compositions are prepared by melt mixing at 180°–185° C. the base composition with various plasticizers. The amount of plasticizer is 20 parts per 100 parts rubber in the base composition. Stock 1, a control, is melt mixed without any plasticizer under the same conditions as the plasticized stocks. The plasticizers of Stocks 2–9, respectively, are (2) methyl phthalyl ethyl glycolate, Santicizer M-17, (3) $C_1$–$C_9$ trimellitate, Santicizer 79 TM, (4) butyl phthalyl butyl glycolate, Santicizer B-16, (5) polymeric polyester, Santicizer 429, (6) diundecyl phthalate, (7) isodecyl diphenyl phosphate, Santicizer 148, (8) mixed $C_7$, $C_9$, $C_{11}$ dialkyl phthalate, Santicizer 711, and (9) mixed $C_7$–$C_9$ dialkyl adipate, Santicizer 97. The data show that different types of plasticizers are effective and that the addition of plasticizer reduces the Shore D hardness 5–7 units and oil swell 21–29%.

If softer compositions are desired, more plasticizer may be added. For example, a composition as above but containing 120 parts of Santicizer 97 exhibits a tensile strength of 5.6 MPa, ultimate elongation of 250%, tension set of 15% and a Shore A hardness of 64.

A compatibilized composition of the invention is prepared by dynamically vulcanizing by the procedure of Table 1 a blend comprising 60 parts of Vamac G, 40 parts of polypropylene, 3 parts of coupling agent (Hercules S3076, a silane sulfonyl azide of the formula $(CH_3O)_3$—Si—R—$SO_2N_3$). These ingredients were melt mixed 4–5 minutes to form a graft copolymer before the curatives were added. Then 0.9 parts of MDA, 0.3 MCA and 1.2 parts of N-445 were added and mixing is continued until dynamic vulcanization is complete. The compatibilized composition has a tensile strength of 19.3 MPa, ultimate elongation of 365%, tension set of 40% and a true stress at break of 90 MPa. A control composition without coupling agent has a TSB of only MPa.

To illustrate the invention as it applies to the use of rubbers having functionalities other than carboxy, a series of compositions was prepared and tested, in which polypropylene was melt-mixed with acrylic ester copolymers having hydroxy, epoxy and chlorine functionalities.

One compatibilizer graft copolymer was prepared by charging 2 weight parts of MA-PP-1 maleic acid modified polypropylene (preparation described above) and one weight part of an amine-terminated NBR rubber (sold under the trademark Hycar 1300X×21) to a Brabender Mixer and mixing 5 minutes at 190° C. The graft copolymer was removed, cooled in a press, and identified as "Compatibilizer-A."

Another compatibilizer graft copolymer was prepared in the same manner as Compatibilizer A, except that three weight parts of MA-PP-1 and two weight parts of a hydroxy-terminated acrylic ester copolymer (Hycar 4004-1) were used. The resultant graft copolymer was identified as "Compatibilizer X."

The functionalized acrylic copolymer rubbers used were Hycar 4004-1 (described above and referred to in Table 9 as AR-OH), an epoxy-functional acrylic ester copolymer rubber (Hycar 211-60-16-3, referred to as AR-Epoxy) and an active chlorine functional acrylic ester copolymer rubber (Hycar 4043, referred to as AR-CL). Curatives used were DIAK-4 and tolylene diisocyanate (TD1). The stocks were mixed as in previous examples; the rubber, compatibilizer and polypropylene (PP) were melt mixed in the Brabender at 80 rpm for two minutes at a set temperature of 180° C., and the curatives were then added. After dynamic vulcanization was completed the stocks were remixed for 1–2 minutes, compression molded at 210° C. and tensile tested at 20 in/min.

Proportions and test results are set forth in Table 9. The results show that, in all cases, presence of compatibilizer gave tensile properties improved over the controls.

In order to demonstrate the invention when acrylic ester copolymers are used which contain no functionality other than the ester, a series of compositions were prepared based on polypropylene (PP) and a copolymer of ethyl acrylate and methyl acrylate (80/20) sold by Gulf under the designation "PE 2205" (AR). Compatibilizers used were Compatibilizer A, described above and Compatibilizer B, made by the following procedure: First a modified polypropylene was prepared by reacting 100 parts of Profax 6801 with 2.5 parts of maleic acid and 0.15 parts of Lupersol 101 peroxide in a Brabender Mixer at 100 rpm at 180° C. Mixing was continued five minutes after peroxide addition. The product was then mixed five minutes after addition thereto of 5 parts by weight of 4,4'-methylene-bis-cyclohexylamine. After cooling and crushing, the mass was suspended in boiling xylene, cooled, and washed with acetone. The purified modified polypropylene product was then mixed in the Brabender Mixer with Vamac G in a weight ratio of 60 Vamac to 40 modified polypropylene. The product of this

TABLE 9

|  | 1 | 2 | 3 | 4 | 5 | 6 | 7 | 8 | 9 |
|---|---|---|---|---|---|---|---|---|---|
| AR-OH | 60 | 57 | 60 | 54 | — | — | — | — | — |
| AR-EPOXY | — | — | — | — | 60 | 57 | — | — | — |
| AR-CL | — | — | — | — | — | — | 60 | 57 | 51 |
| PP | 40 | 34 | 36 | 36 | 40 | 36 | 40 | 38 | 38 |
| Compatibilizer A | — | 9 | 4 | — | — | 9 | — | 9 | 9 |
| Compatibilizer X | — | — | — | 10 | — | — | — | — | — |
| DIAK-4 | — | — | — | — | — | — | 0.9 | — | 0.9 |
| TDI | 1.5 | 1.5 | 1.5 | 1.5 | 0.6 | 0.6 | — | — | — |
| Properties |  |  |  |  |  |  |  |  |  |
| TS, MPa | 6.2 | 11.8 | 6.8 | 6.9 | 6.1 | 9.9 | 6.3 | 10.0 | 11.3 |
| $M_{100}$, MPa | — | 9.7 | 6.7 | 6.8 | — | 9.0 | — | 9.2 | 10.3 |
| U.E., % | 48 | 225 | 144 | 114 | 60 | 260 | 25 | 230 | 142 |
| Shore D Hardness | 34 | 40 | 32 | 34 | 32 | 39 | 39 | 38 | 40 |
| Ten. Set, % | Broke | 51 | 50 | 53 | Broke | 61 | Broke | 60 | 58 |
| #3 ASTM Oil, 70 h @ 100° C. wt. % Swell | 30 | 30.8 | 30.8 | 29.7 | 33.8 | 36.1 | 15.2 | 20.4 | 19.4 |

TABLE 10

|  | 1 | 2 | 3 | 4 | 5 | 6 |
|---|---|---|---|---|---|---|
| PP | 30 | 30 | 30 | 30 | 30 | 30 |
| AR | 70 | 70 | 70 | 70 | 70 | 70 |
| Compatibilizer A | — | — | 5 | 5 | — | — |
| Compatibilizer B | — | — | — | — | 5 | 5 |
| LICA-44 | — | .875 | — | .875 | — | .875 |
| Titanate-A | — | 2.8 | — | 3.5 | — | 3.5 |
| Properties |  |  |  |  |  |  |
| TS, MPa | 10.7 | 17.1 | 8.7 | 17.3 | 13.4 | 16.2 |
| $M_{100}$, MPa | 7.1 | 9.9 | 8.0 | 10.7 | 8.7 | 10.3 |
| $M_{300}$, MPa | 7.8 | 15.7 | 8.6 | 17.1 | 10.1 | — |
| U.E., % | 640 | 330 | 310 | 320 | 540 | 290 |
| Shore D Hardness | 37 | 42 | 37 | 42 | 38 | 42 |
| Ten. Set, % | 52 | 50 | Broke | 51 | 54 | 50 | mixture was designated "Compatibilizer B."

Curatives used were LICA-44, described by its manufacturer, Kenrich Petrochemicals, Inc., as having the formula: RO—Ti(O—$C_2H_4$—NH—$C_2H_4$—$NH_2$)$_3$, and Titanate-A, made by the procedure of U.S. Pat. No. 4,415,710. The proportions of the stocks and the results of physical tests are shown in Table 10. Tensiles were measured at 2 in/min. The results show that the compatibilizers increased the modulus of compositions containing both the cured and uncured acrylate ester copolymer.

Although the invention has been illustrated by typical examples, it is not limited thereto. Changes and modifications of the examples of the invention herein chosen for purposes of disclosure can be made which do not constitute departure from the spirit and scope of the invention.

The embodiments of the invention in which an exclusive property or privilege is claimed are defined as follows:

1. A compatibilized polymer composition comprising a blend of about 1-99 parts by weight of an olefin polymer comprising amorphous or crystalline essentially saturated homopolymers or copolymers of $C_2$–$C_8$ alpha monoolefins, about 99-1 parts by weight of cured acidic acrylic ester copolymer rubber containing about 0.1-25 mole percent of carboxylic acid; and at least about 0.1 weight percent of a graft copolymer comprising at least one olefin polymer compatibilizing segment derived from an olefin polymer selected from the group consisting of amorphous or crystalline essentially saturated homopolymers or copolymers of $C_2$–$C_8$ alpha monoolefins, polybutadiene, polyisoprene, and polyalkenamer and at least one acidic acrylic ester copolymer rubber compatibilizing segment derived from a polymer selected from the group consisting of epichlorohydrin polymer, nitrile rubber, urethane polymer, vinyl chloride polymer, polyamide, polyamine, acrylic polymer, polyester, and acidic acrylic ester copolymer rubber.

2. The composition of claim 1 in which the graft copolymer is derived from an olefin polymer containing one or more graft forming functional groups.

3. The composition of claim 2 in which the graft copolymer is derived from an acidic acrylic copolymer rubber.

4. The composition of claim 3 comprising about 10-90 parts by weight of olefin polymer and correspondingly, about 90-10 parts by weight of acidic acrylic copolymer rubber, and about 0.5 to 25 weight percent of graft copolymer.

5. The composition of claim 4 in which the graft copolymer is formed by reaction between a graft forming functional group of an olefin polymer and an acid group of an acidic acrylic copolymer rubber.

6. The composition of claim 4 in which the copolymer rubber is a copolymer of ethylene, alkyl acrylate and unsaturated carboxylic acid.

7. The composition of claim 6 in which the graft copolymer is formed by reaction of a graft forming functional group of an olefin polymer and an acid group of an acidic acrylic copolymer rubber with a grafting agent having two or more reactive groups with at least one group which will react with the functional group of the olefin polymer and at least one other group which will react with the acid group of the acid acrylic copolymer rubber.

8. The composition of claim 7 in which the graft forming group of the olefin polymer is selected from the group consisting of carboxy, halo, amino, and a group derived from methylol phenolic material.

9. The composition of claim 8 in which the grafting agent is an organic compound containing at least two amino groups.

10. The composition of claim 9 in which the olefin polymer is crystalline polypropylene or polyethylene.

11. The composition of claim 10 in which the rubber comprises at least 50 mole percent of ethylene, about 0.5 to 10 mole percent of carboxylic acid, and up to about 49.5 mole percent of alkyl acrylate.

12. The composition of claim 11 in which the graft copolymer is prepared from olefin polymer containing a graft forming functional group derived from methylol phenolic material.

13. The composition of claim 11 in which the graft copolymer is prepared from olefin polymer containing a graft forming functional group derived from unsaturated acid.

14. The composition of claim 13 in which the graft copolymer is prepared from olefin polymer containing a graft forming functional group derived from maleic acid or anhydride.

15. The composition of claim 14 in which the grafting agent is a $C_6$–$C_{20}$ diamine.

16. The composition of claim 11 in which the composition is thermoplastic and the blend comprises about 20–60 parts by weight of polypropylene, and about 80–40 parts by weight of cured acidic acrylic copolymer rubber in which the blend is dynamically vulcanized.

17. The composition of claim 4 in which the graft copolymer is prepared in situ.

18. The composition of claim 14 in which the graft copolymer is prepared in situ.

19. The composition of claim 16 in which the graft copolymer is prepared in situ.

20. A compatibilized polymer composition comprising a blend of about 1–99 parts by weight of an olefin polymer comprising amorphous or crystalline essentially saturated homopolymers or copolymers of $C_2$–$C_8$ alpha monoolefins, about 99–1 parts by weight of a cross-linked acrylic ester copolymer rubber and at least about 0.1 weight percent of a graft copolymer comprising at least one olefin polymer compatibilizing segment derived from an olefin polymer selected from the group consisting of amorphous or crystalline essentially saturated homopolymers or copolymers of $C_2$–$C_8$ alpha monoolefins, polybutadiene, polyisoprene, and polyalkenamer and at least one acrylic ester copolymer rubber compatibilizing segment derived from a polymer selected from the group consisting of epichlorohydrin polymer, nitrile rubber, urethane polymer, vinyl chloride polymer, polyamide, polyamine, acrylic polymer, polyester, and cross-linkable acrylic ester copolymer rubber.

21. The composition of claim 20 in which the graft copolymer is derived from an olefin polymer containing one or more graft forming functional groups, and from an acrylic ester copolymer rubber.

22. The composition of claim 21 comprising about 10–90 parts by weight of olefin polymer and, correspondingly, about 90–10 parts by weight of acrylic ester copolymer rubber and about 0.5 to 25 weight percent of graft copolymer.

23. The composition of claim 22 in which the graft copolymer is formed by reaction between a graft forming functional group of an olefin polymer and a reactive group of a cross-linkable acrylic ester copolymer.

24. The composition of claim 20 in which the copolymer rubber is a cross-linkable copolymer of ethylene, alkyl acrylate and a polymerizable monomer containing reactive groups selected from carboxy, hydroxy, epoxy, halo, amino, isocyanate, sulfonyl, or sulfonate groups.

25. The composition of claim 24 in which the graft copolymer is formed by reaction of a graft forming functional group of an olefin polymer and a reactive group of a cross-linkable acrylic ester copolymer rubber with a grafting agent having two or more reactive groups with at least one group which will react with the functional group of the olefin polymer and at least one other group which will react with the reactive group of the cross-linkable acrylic ester copolymer rubber.

26. The composition of claim 25 in which the graft forming group of the olefin polymer is selected from the group consisting of carboxy, halo, amino, and a group derived from methylol phenolic material.

27. The composition of claim 26 in which the grafting agent is an organic compound containing at least two amino groups.

28. The composition of claim 27 in which the olefin polymer is crystalline polypropylene or polyethylene.

29. The composition of claim 28 in which the rubber comprises at least 50 mole percent of ethylene, about 0.5 to 10 mole percent of monomer containing reactive groups and up to about 49.5 mole percent of alkyl acrylate.

30. The composition of claim 29 in which the graft copolymer is prepared from olefin polymer containing a graft forming functional group derived from methylol phenolic material.

31. The composition of claim 29 in which the graft copolymer is prepared from olefin polymer containing a graft forming functional group derived from unsaturated acid.

32. The composition of claim 31 in which the graft copolymer is prepared from olefin polymer containing a graft forming functional group derived from maleic acid or anhydride.

33. The composition of claim 32 in which the grafting agent is a $C_6$–$C_{20}$ diamine.

34. The composition of claim 29 in which the composition is thermoplastic and the blend comprises about 20–60 parts by weight of polypropylene, and about 80–40 parts by weight of cross-linked acrylic ester copolymer rubber in which the blend is dynamically vulcanized.

35. The composition of claim 22 in which the graft copolymer is prepared in situ.

36. The composition of claim 32 in which the graft copolymer is prepared in situ.

37. The composition of claim 34 in which the graft copolymer is prepared in situ.

* * * * *